US010891250B2

(12) United States Patent
Mumma et al.

(10) Patent No.: US 10,891,250 B2
(45) Date of Patent: Jan. 12, 2021

(54) APPLICATION FOR COLLATING SCATTERED SIGNALS IN A COMPUTER SYSTEM

(71) Applicant: Bank of America Corporation, Charlotte, NC (US)

(72) Inventors: Robert S. Mumma, Chicago, IL (US); John E. Scully, Wilmette, IL (US); Patrick E. Burgess, Jr., Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 30 days.

(21) Appl. No.: 16/052,694

(22) Filed: Aug. 2, 2018

(65) Prior Publication Data

US 2020/0042483 A1  Feb. 6, 2020

(51) Int. Cl.
*G06F 13/40* (2006.01)
*G06F 13/16* (2006.01)
*H04L 29/06* (2006.01)

(52) U.S. Cl.
CPC ...... *G06F 13/4068* (2013.01); *G06F 13/1668* (2013.01); *H04L 63/083* (2013.01)

(58) Field of Classification Search
CPC .............. H04L 63/083; G06F 13/4068; G06F 13/1668; G06F 9/542; G06Q 10/10
See application file for complete search history.

(56) References Cited

U.S. PATENT DOCUMENTS

| | | | |
|---|---|---|---|
| 5,923,848 A * | 7/1999 | Goodhand | G06Q 10/107 709/206 |
| 7,739,345 B2 * | 6/2010 | Heinzel | G06Q 10/107 709/203 |
| 8,126,480 B2 | 2/2012 | Morrison | |
| 8,532,628 B2 | 9/2013 | Kalinichenko et al. | |
| 8,594,707 B2 | 11/2013 | Morrison | |
| 8,775,532 B1 * | 7/2014 | Kumar | G06Q 10/107 455/410 |
| 8,849,922 B1 | 9/2014 | McCorkendale et al. | |
| 8,922,377 B2 | 12/2014 | Carnes | |
| 9,430,131 B1 * | 8/2016 | Zhang | G06F 3/04842 |
| 2011/0119258 A1 * | 5/2011 | Forutanpour | G06Q 10/107 707/723 |

(Continued)

*Primary Examiner* — Farley Abad
(74) *Attorney, Agent, or Firm* — Weiss & Arons LLP; Michael A. Springs, Esq.

(57) ABSTRACT

Aspects of the disclosure relate to computer applications for collating scattered signals in a computer system. The computer system may include a processor, memory, display, and a plurality of applications. The plurality of applications may include a central application and a plurality of peripheral applications. The peripheral applications may generate signals. The central application may access the signals generated by the peripheral applications. The central application may collate the signals and store the collated signals. The central application may present the collated signals on the display. The collated signals may be actionable in the central application. Actions performed in response to the collated signals in the central application may be conveyed to the peripheral application from where the collated signal originated.

12 Claims, 7 Drawing Sheets

(56) References Cited

U.S. PATENT DOCUMENTS

| | | | |
|---|---|---|---|
| 2012/0113978 A1* | 5/2012 | Cerami | H04M 1/2535 |
| | | | 370/352 |
| 2012/0239541 A1 | 9/2012 | Tsukahara et al. | |
| 2013/0198300 A1* | 8/2013 | Briggman | H04L 51/22 |
| | | | 709/206 |
| 2014/0358799 A1 | 12/2014 | Kingston et al. | |
| 2015/0006297 A1* | 1/2015 | Stark | G06Q 30/0269 |
| | | | 705/14.66 |
| 2015/0081554 A1* | 3/2015 | Wong | G06Q 20/401 |
| | | | 705/44 |
| 2015/0254577 A1* | 9/2015 | Sullivan | G06Q 10/00 |
| | | | 705/51 |
| 2018/0101901 A1 | 4/2018 | Jones-McFadden et al. | |

\* cited by examiner

APPLICATION FOR COLLATING SCATTERED SIGNALS IN A COMPUTER SYSTEM

FIELD OF TECHNOLOGY

Aspects of the disclosure relate to computer-based applications. Specifically, aspects of the disclosure relate to applications for responding to scattered signals in a computer system.

BACKGROUND OF THE DISCLOSURE

Billions of users around the world use computerized devices. Common usages may relate to personal, business, entertainment, security, financial, or educational purposes. The usage may be for any other suitable purpose. A user may use multiple computerized devices. A user may use a computerized device for multiple purposes. A user may use a computerized device many times in one day.

A computerized device may contain one or more applications. The applications may provide functionality to a user of the computerized device. The applications may relate to one or more purposes. A user may depend on the application for important information and/or tasks.

An application may generate signals. The signals may be intended for a user. A signal may be a message. A signal may be an alert. A signal may be an indicator. A signal may be a call to action for a user to perform an action in response to the signal. A signal may be associated with a level of importance, relevancy, and/or urgency to a user.

A user may be the intended recipient of many signals. Multiple signals may be generated by a single application. Multiple applications on a device may each generate multiple signals. Multiple devices may each include multiple applications that each generate multiple signals.

Many signals intended for a user may be scattered across one or more computer systems. For example, one application may generate multiple e-mail messages over a span of time. The messages may be interspersed among a mass of other emails received by the user. Another application may generate multiple short messaging service (SMS) messages. Yet another application may generate one or more alerts that pop up on a screen for a period of time. After the period of time the alerts may not be accessible to, or remembered by, the user.

A user may be overwhelmed by many varied signals. A user may miss some signals altogether. A user may lose track of signals and not be able to access them. A user may forget about signals. When a signal is missed, inaccessible, forgotten, or otherwise lost, information may be lost. The lost information may be important. The lost information may be a call to action. The action may be vital to prevent personal or financial harm. Losing the signal, and thus the call to action, may thereby lead to personal or financial harm.

There is a need, therefore, to provide systems and methods for collating scattered signals in computer systems. It would be desirable to display the collated signals in a central location in the computer system. It would be further desirable to configure the collated signals to be actionable at the central location.

SUMMARY OF THE DISCLOSURE

Aspects of the disclosure relate to a central application for collating scattered signals in a computer system. The central application may include computer-executable code stored in a non-transitory memory of the computer system. The central application, when run on a processor of the computer system, may be configured to access one or more signals. Each signal may be generated by one of a plurality of peripheral applications. The peripheral applications may be associated with the computer system or with another computer system.

The central application may collate the signals based on a predetermined set of rules. The central application may store the collated signals in memory. In response to a predetermined trigger, the central application may present the collated signals on a display of the computer system based on the set of predetermined rules. When presented on the display, the central application may configure the collated signals to be actionable. The collated signals may be configured to be actionable in the central application via an input/output component of the computer system.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Aspects of the disclosure relate to a central application for collating scattered signals in a computer system. A computer system may be a mobile phone. A computer system may be a smart-watch, tablet, laptop, desktop, or any other suitable computing device.

An application may be any application that fulfills a particular purpose in a computer system. An application may be software and/or hardware based. An application may be a program, utility, website, server, operating system, or any suitable computer-based application.

The central application may include computer-executable code stored in a non-transitory memory of the computer system. The central application, when run on a processor of the computer system, may be configured to access one or more signals. Each signal may be generated by one of a plurality of peripheral applications that may be associated with the computer system. A peripheral application may also be associated with another computer system.

An application associated with a computer system may include hardware and/or software that is installed in the computer system. Alternatively, an application associated with a computer system may be accessible by the computer system, but based in the "cloud," the internet, a network, or otherwise out of the computer system. For example, the computer system may include ten applications installed on the computer system. One installed application may be the central application. The nine other installed applications may be peripheral applications that generate signals. A number of other peripheral applications may be cloud-based but accessible to the computer system. A number of other peripheral applications may be associated with different computer systems, yet generate signals intended for receipt on the computer system. All of the aforementioned examples of peripheral applications may be considered associated with the computer system.

A signal may be a message. Examples of messages include email and SMS. A signal may be an alert. An alert may be a pop-up that alerts a user with information. A signal may be an indicator. An indicator may indicate certain information. For example, an indicator may show that a resource is running low. Resources may include battery power, connectivity, and data allowance. Resources may also include gasoline and other suitable fluids in computer systems associated with vehicles and the like. A signal may be a call to action for a user to perform an action in response to the signal. A signal may be any suitable signal intended for receipt by a computer system, or a user of a computer system.

The central application may collate the scattered signals based on a predetermined set of rules. Collating scattered signals may include aggregating signals that are scattered across a computer system. Collating scattered signals may also include organizing the aggregated signals in a specific manner.

Collating the signals may include accessing peripheral applications and discovering the presence of signals. In some embodiments, all discovered signals may be imported for collation. In other embodiments, only select signals may be imported. Importing discovered signals may include copying and organizing the signals in the central application based on the predetermined set of rules. For example, the predetermined rules may direct the central application to organize the signals in a certain order based on predetermined criteria for ranking. Criteria may include urgency, relevancy, and/or importance. The central application may then store the collated signals in memory.

In response to a predetermined trigger, the central application may present the collated signals on a display of the computer system. The collated signals may be displayed in a manner that is based on the set of predetermined rules. For example, the collated signals may be displayed top to bottom on the display based on a ranking established by the predetermined rules.

The central application may configure the collated signals to be actionable in the central application when presented on the display. The collated signals may be actionable via an input/output component of the computer system. For example, a collated signal may be an email message that prompts a reply. The central application may provide functionality for typing a reply via a keyboard or touchscreen. The central application may be configured to send the reply to the appropriate recipient.

In certain embodiments, the central application may be configured to self-execute. A self-executing central application may autonomously perform actions in response to signals. The signals may be signals that require a response within a predetermined short period of time. For example, a signal that requires a response within 8 hours, or any other suitable short period of time, may trigger the central application to perform an action. The central application may send a message to a user indicating that an action will be performed autonomously unless the user initiates an override.

The central application may be configured to communicate with each peripheral application via a secure, bidirectional, channel. Access to a secure, bidirectional, channel may enable the central application to receive a signal from a peripheral application, as well as convey an action back to the peripheral application. The central application may be configured to convey, over a secure, bidirectional, channel to a peripheral application from where a collated signal originated, an action performed in the central application in response to the collated signal. The peripheral application from where a collated signal originated may be the peripheral application that generated the scattered signal that was accessed by the central application and collated. Conveying an action may include signaling to the peripheral application that the signal has been addressed and/or responded to.

A secure, bidirectional, channel may provide the central application with the ability to convey actions to the peripheral applications, even if the peripheral applications are access-restricted. An access-restricted application may require authentication to gain access. Authentication may include a password, signature, biometrics, status, or device profile.

The secure, bidirectional, channel may enable the central application to provide authentication credentials to satisfy an authentication requirement. The central application may include authentication information such as a password, signature, and/or user biometric information. The secure, bidirectional, channel may be configured to bypass the authentication requirement. Bypassing the authentication requirement may be achieved by granting the central application privileged status and/or permissions. The peripheral applications may be aligned to grant access to the central application with privileged status and/or permissions. The permissions may be application-based. Configuring the central application to satisfy, bypass, or otherwise circumvent an access-restriction of a peripheral application may be at least a part of the secure, bidirectional, channel for conveying actions to the peripheral application.

The central application may access the signals in multiple ways. In one embodiment, the central application may be configured to communicate with each peripheral application via a privileged channel for the accessing of signals. The privileged channel may provide the central application with the ability to pull signals that are generated by, and stored in, the peripheral application, even if the peripheral application is access-restricted.

The privileged channel may enable the central application to provide authentication credentials to satisfy an authentication requirement. The central application may include authentication information such as a password, signature, and/or user biometric information. The secure, bidirectional, channel may be configured to bypass the authentication requirement. Bypassing the authentication requirement may be achieved by granting the central application privileged status and/or permissions. The peripheral applications may be aligned to grant access to the central application with privileged status and/or permissions. The permissions may be application-based. Configuring the central application to satisfy, bypass, or otherwise circumvent an access-restriction of a peripheral application may be at least a part of the privileged channel for pulling, or otherwise accessing, signals in the peripheral application.

In certain embodiments of the central application, the accessing of signals may include receiving the generated signals at the central application. In one embodiment, the central application may configure the peripheral applications to transmit signals to a predetermined location at, or accessible to, the central application.

In some embodiments of the central application the predetermined trigger for displaying collated signals may be substantially continuous. For example, the central application may be always displayed on a portion of the display. The portion may be a vertical or horizontal bar at a perimeter of the display. A portion may be a box at a corner of the display. The box may be expandable by hovering a cursor over the box, or some other suitable mechanism.

In other embodiments of the central application, the predetermined trigger may be periodic. The periodic trigger may be based on a preset period of time elapsed between triggers. For example, the central application may display collated signals every hour. The preset period may be every month, week, day, 8 hours, 6 hours, 4 hours, or two hours. The preset period may be any other suitable period of time.

In some embodiments of the central application, the predetermined trigger may be based on a preset time and/or event. For example, the predetermined trigger may be every time a signal is accessed. The predetermined trigger may be 9:00 AM every workday. The predetermined trigger may be an hour, 6 hours, or a day before a deadline for an action to be performed in response to a signal. The predetermined trigger may be when a user selects or otherwise opens the central application. Selecting the central application may include clicking on an application icon with a cursor, touching an icon on a touch-enabled screen, or any other suitable mechanism. The predetermined trigger may be any other suitable time or event.

In some embodiments of the central application, the collated signals may be organized and displayed in a manner that reflects a ranking, based on suitable metrics, of the collated signals. A higher ranked signal may be displayed more prominently than a lower ranked signal. For example, a higher ranked signal may be presented higher up on a screen. A higher ranked signal may be presented larger than a lower ranked signal. The signals may be presented from right to left in order of descending rank. The highest ranked signals may be summarized and highlighted on top of a screen.

In one embodiment of the central application, the predetermined rules include collating and presenting the signals on the display from top to bottom ranked in order of decreasing urgency. The urgency of each signal may be based at least in part on a time allotted to perform an action in response to the signal. For example, a first signal may be an email with a deadline for response in 24 hours. A second signal may be an alert to pay a bill within 12 hours. The second signal may be ranked as more urgent, and therefore displayed above the first signal.

In certain embodiments of the central application, the predetermined rules include collating and presenting the signals in order of decreasing relevancy to the computer system. Relevancy may be measured as the likelihood of a user of the computer system to engage in an action in response to the signal. In some embodiments, relevancy may be determined at least in part based on historical data. Historical data may include actions performed on the computer system. The historical data may indicate which signals require actions that a user is statistically likely to perform. For example, historical data may show that a user generally pays a credit card bill during the hours of a lunch break on the first of the month. In this example, the central application may rank an alert related to paying a credit card as highly relevant during the aforementioned time.

In some embodiments, the relevancy may be determined at least in part using artificial intelligence (AI) and/or machine learning (ML) technology. AI and/or ML technology may use historical data. Historical data may include data gathered on the computer system. Historical data may include data gathered on other computer systems. Historical data may include data regarding a particular user. AI and/or ML techniques may use rules and/or models to determine a level of relevancy for a particular signal. The determination may be periodically or substantially continuously updated with the introduction of new data.

One or more non-transitory computer-readable media are provided. The computer-readable media may store computer-executable instructions which, when executed by a processor on a computer system, perform a method for collating scattered signals. The method may include accessing one or more signals generated by at least one of a plurality of peripheral applications. The method may include collating the signals. The method may also include, in response to a predetermined trigger, presenting the collated signals on a display of the computer system in a predetermined order. Presenting signals in an order on the display may include displaying the signals based on a ranking. The ranked signals may be displayed top to bottom, right to left, large to small, or otherwise more to less prominent.

In some embodiments of the computer-readable media, the predetermined order in the method may be based on a ranking of decreasing urgency. The urgency of each signal may be based at least in part on a time allotted to perform an action in response to the signal. In some other embodiments of the computer-readable media, the predetermined order in the method may be based on a ranking of decreasing relevancy. The relevancy of each signal may be based at least in part on historical data. The historical data may include actions performed on the computer system.

In certain embodiments of the computer-readable media, the method may further include conveying an action performed in response to a collated signal. The action may be conveyed to a peripheral application from where the collated signal was retrieved. A peripheral application from where a collated signal was retrieved may be the peripheral application that generated the scattered signal that was accessed by the central application and collated. The method may include accomplishing the conveying even if the peripheral application is access-restricted.

In some embodiments of the computer-readable media, the accessing one or more signals in the method may include pulling signals that are generated by, and stored in, a peripheral application. The method may include accessing the signals even if the peripheral application is access-restricted.

In some embodiments of the computer-readable media, the accessing one or more signals in the method may include accessing each of the peripheral applications, one at a time in a loop, to check for generated signals. The loop may be substantially continuous. The loop may run based on a predetermined time and/or event. For example, the loop may run at 9:00 AM on every workday. The loop may run at 5:00 PM on every workday.

The loop may be periodic based on a predetermined period of time. For example, the loop may run every hour. Other exemplary periods of time may be a minute, 5 minutes, 10 minutes, 15 minutes, half an hour, half a day, a day, and a week.

In certain embodiments, the loop may access each peripheral application in a random order. In other embodiments the loop may access the peripheral applications in a predetermined order. In still other embodiments, the loop may access some peripheral applications more frequently than others. The frequency of access may be determined manually or based on predetermined metrics. The metrics may include frequency, relevance, urgency, and importance of signals generated by each peripheral application.

A central application for collating scattered signals in a computer system is provided. The central application may include computer-executable code stored in a non-transitory memory of the computer system. The central application, when run on a processor of the computer system, may be configured to access one or more signals. The signals may be generated by at least one of a plurality of peripheral applications of the computer system.

The central application may collate the signals based on a set of predetermined rules. The central application may store the collated signals in memory. In response to a predetermined trigger, the central application may present the collated signals on a display of the computer system based on the set of predetermined rules.

In certain embodiments of the central application, the collated signals may be actionable in the central application. An action performed in the central application in response to a collated signal may be conveyed over a secure channel to a peripheral application from which the collated signal was accessed. The conveying may be accomplished even if the peripheral application is password-protected.

In some embodiments of the central application, the accessing one or more signals includes pulling signals that are generated by, and stored in, a peripheral application. The central application may be configured to access the signals even if the peripheral applications are password-protected.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
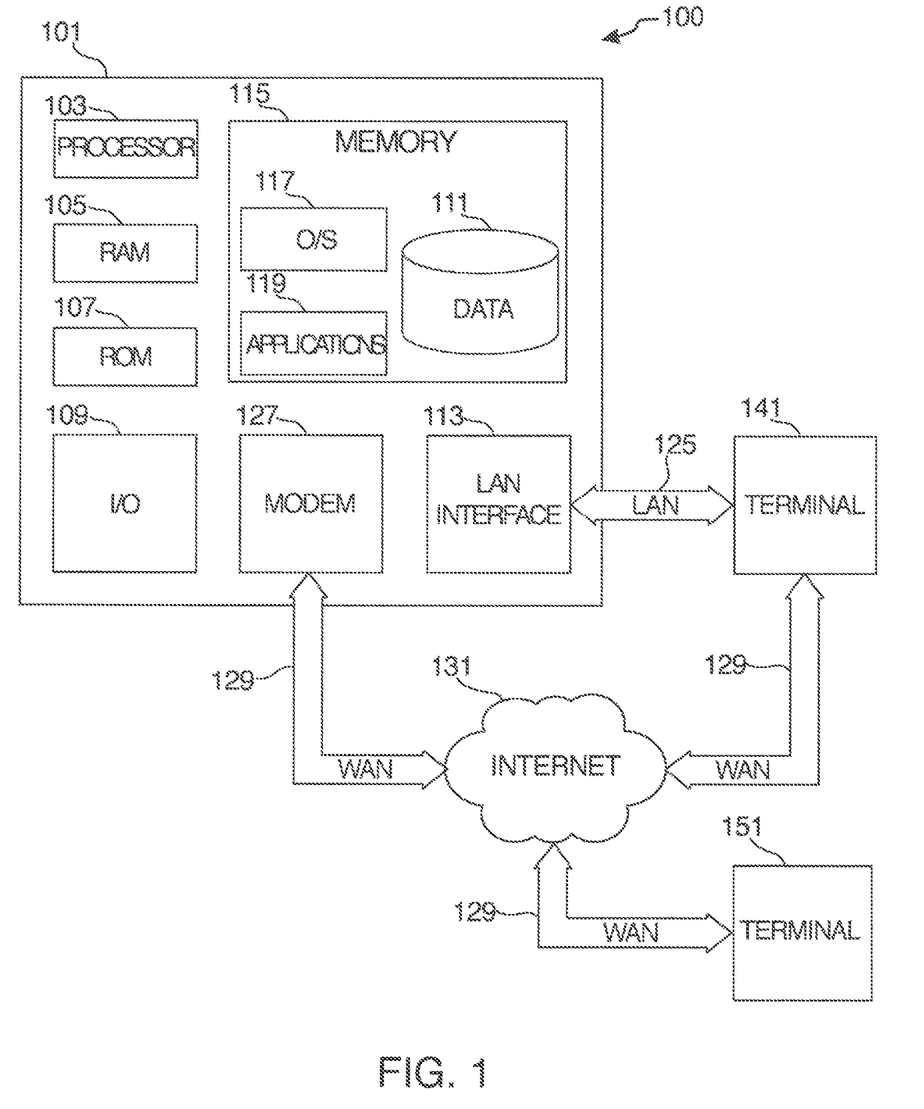
FIG. 1 shows an illustrative system in accordance with principles of the disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device.

Computer 101 may have a processor 103 for controlling the operation of the device and its associated components, and may include RAM 105, ROM 107, input/output module 109, and a memory 115. The processor 103 may also execute all software running on the computer—e.g. the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server need not stream the data to the computer system. This may be beneficial for the computer system, because the retrieval may be faster than data-streaming. Users may not become frustrated because they do not need to wait to run the applications. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "applications") may include computer executable instructions for invoking user functionality related performing various tasks. The various tasks may be related to the user's finances, shopping, recreation, relationships, or other business or personal affairs. Applications 119 may generate signals. Applications 119 may include a central application and a plurality of peripheral applications.

Computer 101 and/or terminals 141 and 151 may also be devices including various other components, such as a battery, speaker, antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement services provided by the central application, secondary applications, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
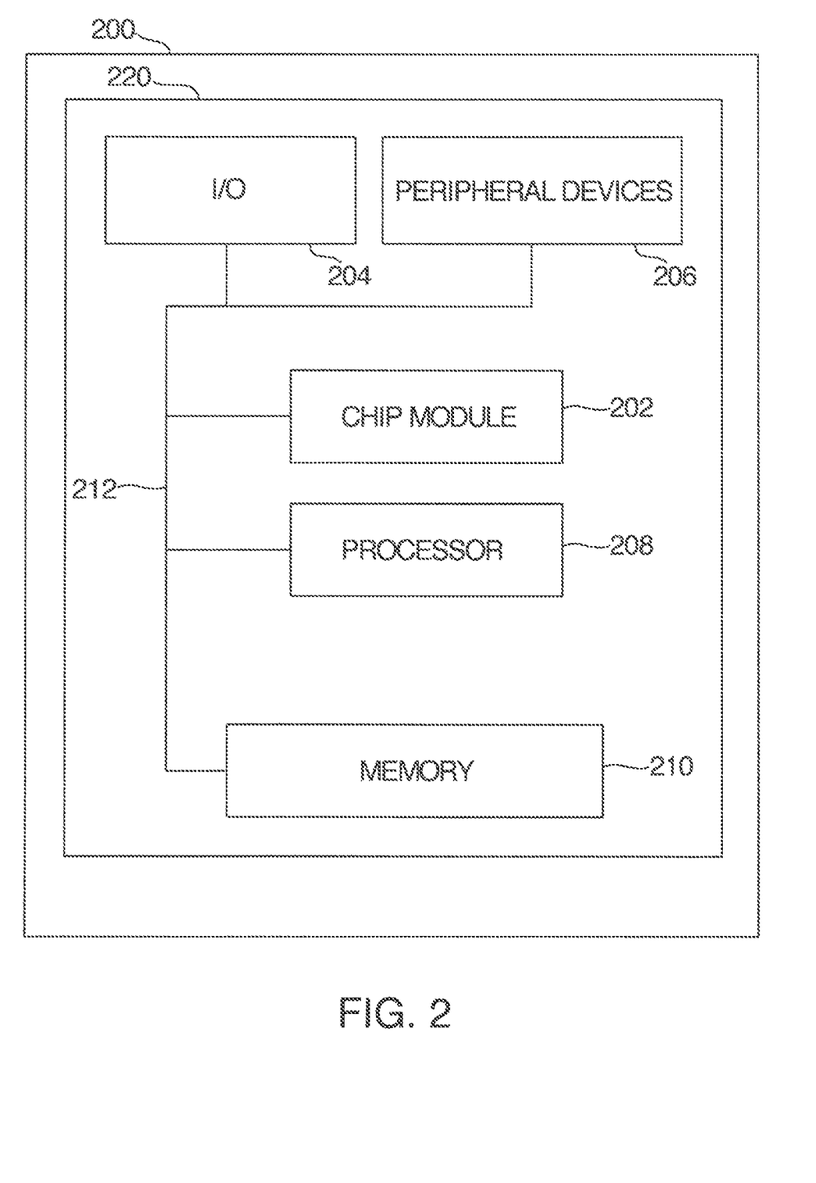
FIG. 2 shows another illustrative system in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
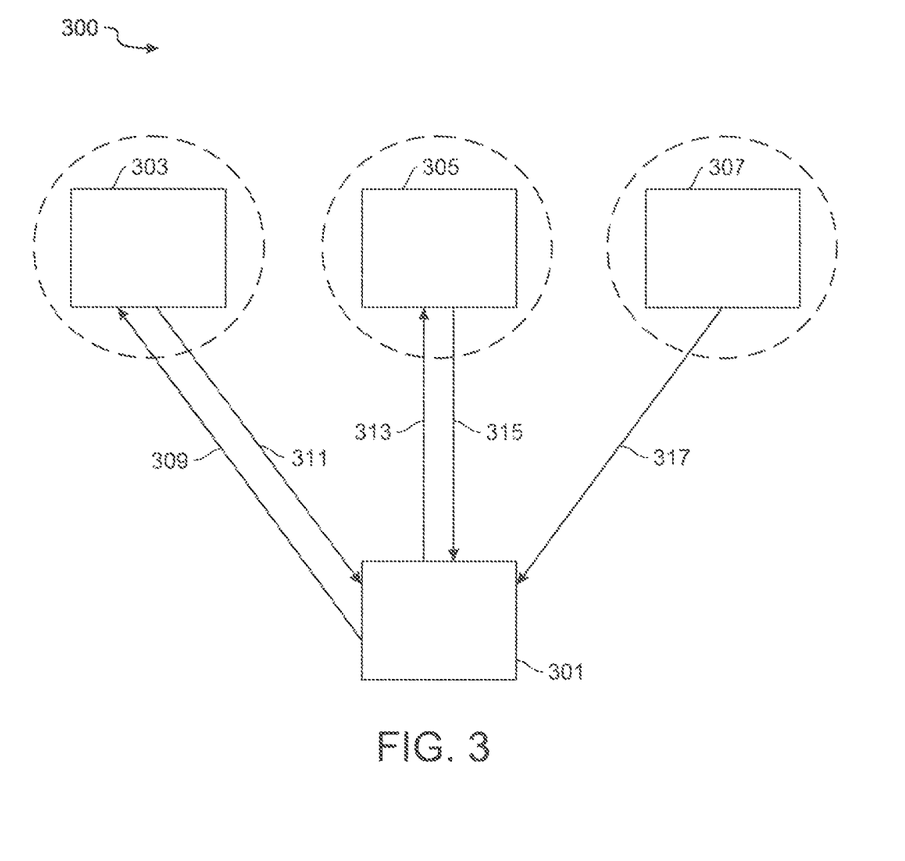
FIG. 3 shows yet another illustrative system in accordance with principles of the disclosure.

FIG. 3 shows illustrative system 300 in accordance with principles of the disclosure. System 300 may represent a plurality of computer applications 301, 303, 305, and 307. Application 301 may be a central application that is installed on a computer system. An exemplary computer system may be a mobile phone, tablet, laptop computer or desktop computer.

Application 301 may be a central application installed on the computer system. Application 303 may be a peripheral application installed on the computer system. Application 305 may be a peripheral application stored in the "cloud" but accessible by the computer system. Application 307 may be a peripheral application that generates signals for receipt on the computer system. Application 307 may be based on a different computer system. Applications 303, 305, and 307 may be access-restricted, as indicated by the broken lines surrounding the applications.

An exemplary application 303 may be a banking application. Application 303 may generate signals such as "payment due" alerts. Central application 301 may have access to a secure, bidirectional, channel. The secure, bidirectional, channel may include channels 309 and 311. Channel 311 may be a privileged channel that enables central application 301 to access and pull signals contained in application 303. Channel 309 may be a secure channel that enables central application 301 to convey an action performed in response to a signal back to application 303. An exemplary action performed in response to a signal may be authorization of a payment from a bank account.

An exemplary application 305 may be a messaging application. Application 305 may generate signals such as urgent messages that require replies. Central application 301 may have access to a secure, bidirectional, channel. The secure, bidirectional, channel may include channels 313 and 315. Channel 315 may be a privileged channel that enables central application 301 to access and pull signals contained in application 305.

Central application 301 may be configured to use channel 315 to seek messages with certain characteristics that are in application 305. The certain characteristics may include a specific time window. For example, the central application may be configured to seek only the signals that were generated within a week prior to the accessing. In another example, the central application may be configured to seek only the signals that require a response within 24 hours, or any other suitable time window. The certain characteristics may also include sender, tag, keyword, or any other suitable characteristic. Channel 313 may be a secure channel that enables central application 301 to convey an action performed in response to a signal back to application 305. An exemplary action performed in response to a signal may be a reply message.

An exemplary application 307 may be similar to an email platform. Application 307 may generate signals such as emails that require replies. Central application 301 may receive signals over channel 317. Central application 301 may be configured to use channel 315 to filter messages with certain characteristics that are received from application 305. The certain characteristics may include sender, tag, keyword, or any other suitable characteristic. The filtered messages may be collated, saved, and/or displayed in the computer system. Central application 301 may be configured to be actionable in response to the signal. An exemplary action may be a reply message. In this example, central application 301 may not have or need a secure channel to convey the action. Instead, central application 301 may be configured to transmit the reply message over conventional channels, for example using a typical email platform.

Figure 4:
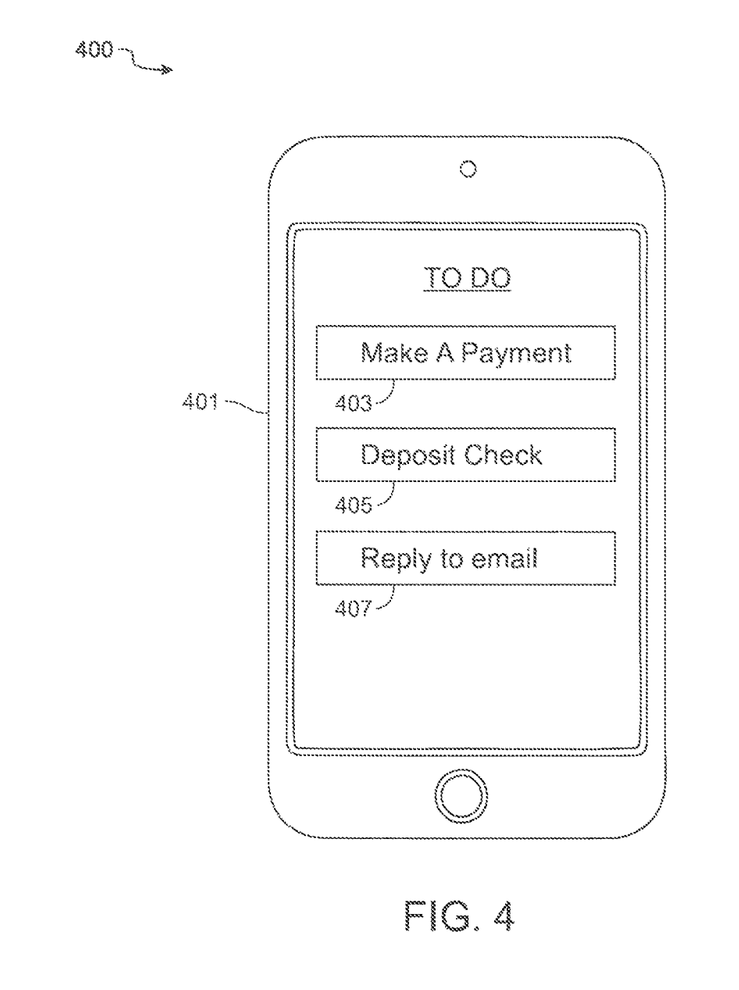
FIG. 4 shows still another illustrative system in accordance with principles of the disclosure.

FIG. 4 shows an illustrative system 400 in accordance with principles of the disclosure. System 400 includes display 401. Display 401 is part of a computer system. The computer system may be a mobile phone.

Display 401 shows an exemplary presentation of collated signals 403, 405 and 407 in a central application. Collated signal 403 may be an alert to make a payment. Collated signal 405 may be an alert to deposit a check. Collated signal 407 may be an alert to reply to an email.

Display 401 may present collated signals 403, 405, and 407 in a predetermined manner. The predetermined manner may be designed to give more prominence to a collated signal that is ranked higher according to predetermined metrics. For example, the predetermined metrics may be related to a ramification associated with the collated signal. In this example, signal 403 may carry a higher financial cost if ignored than signal 405. Similarly, signal 405 may carry a higher financial cost if ignored than signal 407. As such, signal 403 may be presented on top, signal 405 in the middle, and signal 407 on bottom. Signals 403, 405, and 407, as presented on the display, may be configured to be clickable or otherwise selectable. When selected, the central application may be configured to provide additional information, and/or additional functionality.

Figure 5:
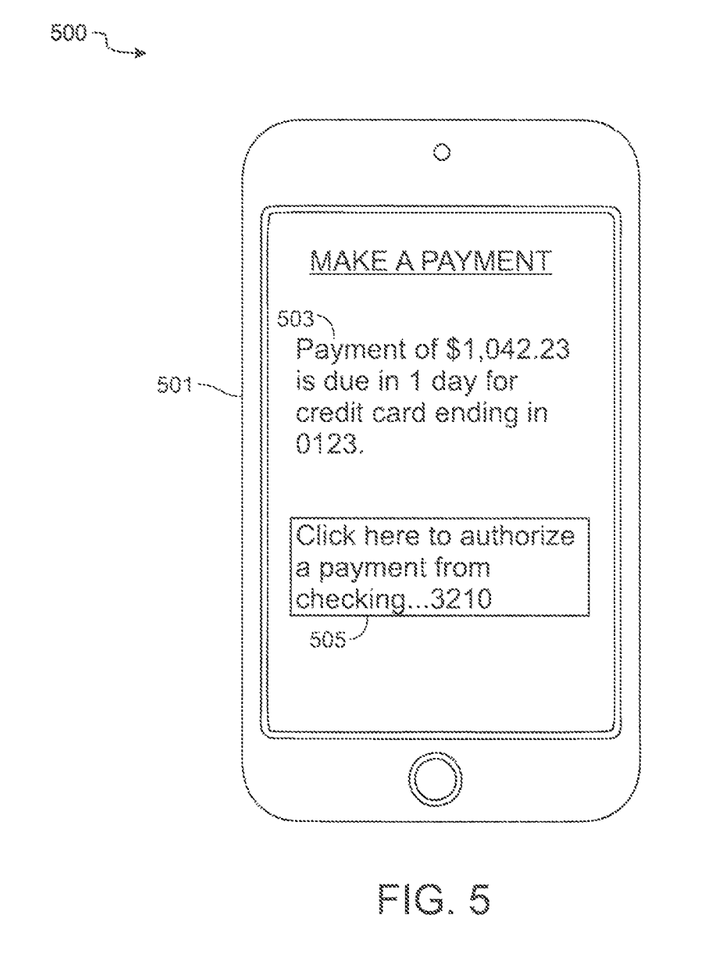
FIG. 5 shows another illustrative system in accordance with principles of the disclosure.

FIG. 5 shows an illustrative system 500 in accordance with principles of the disclosure. System 500 includes display 501. Display 501 is part of a computer system. The computer system may be a mobile phone.

Display 501 may show additional information displayed when a displayed collated signal, such as signal 403 shown in FIG. 4, is selected. The additional information may include informative text 503. Text 503 may display a message similar to "Payment of $1,042.23 is due in 1 day for credit card ending in 0123." Button 505 may display "Click here to authorize a payment from checking account . . . 3210." Button 505 may be clickable. Clicking on button 505 may authorize a payment in response to the signal.

Figure 6:
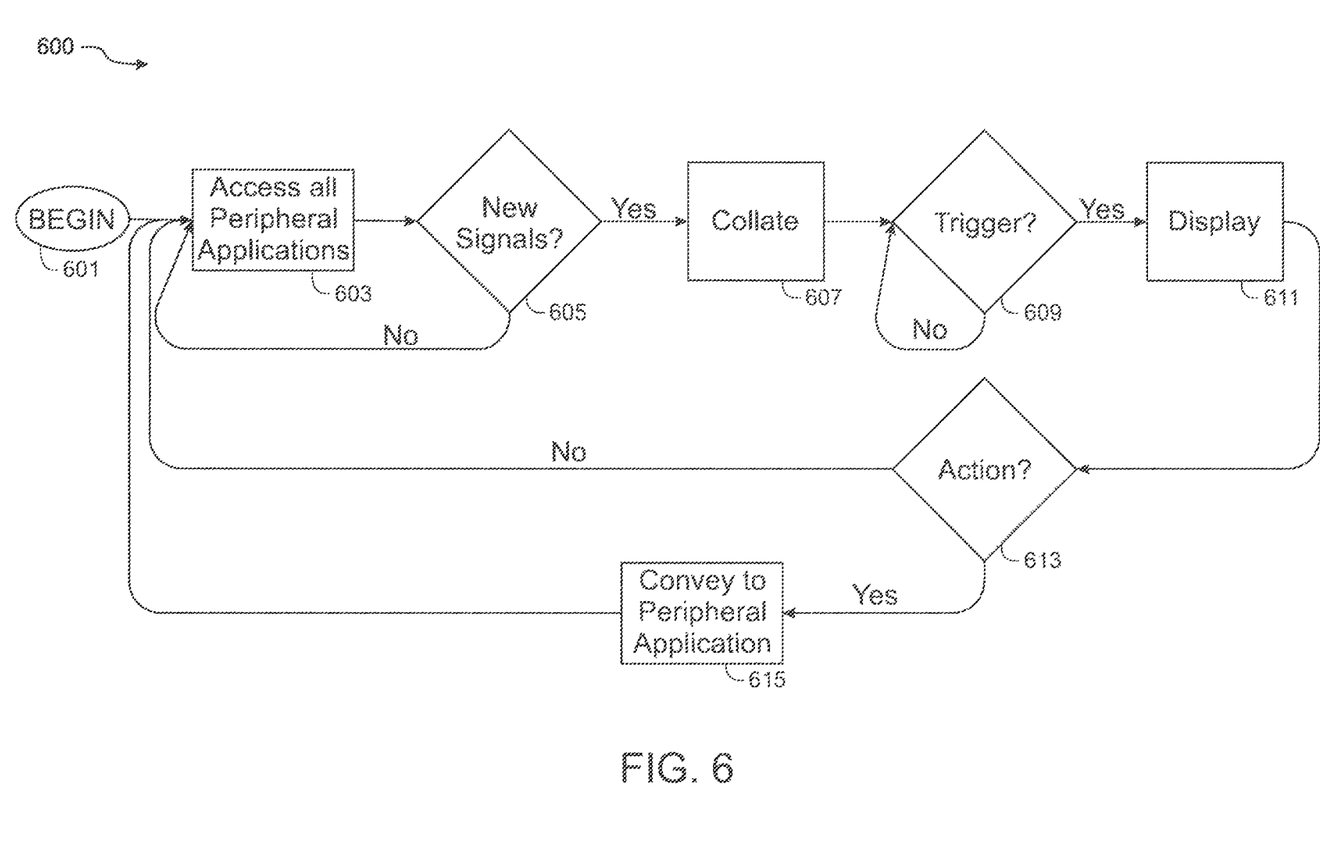
FIG. 6 shows an illustrative flowchart in accordance with principles of the disclosure.

FIG. 6 shows illustrative flowchart 600 in accordance with principles of the disclosure. The flowchart begins at step 601. At step 603, a central application on a computer system accesses a set of peripheral applications. The set may be a predetermined set. The set may be a complete set of all peripheral application associated with the computer system. The set may be manually established and/or modified. Establishing the set may include identifying which peripheral applications to include in the set. The set may include software programs, software applications (apps), websites, applications based in hardware, software, firmware, cloud, or network, or any other suitable signal-generating application.

Step 605 asks whether any new signals were discovered when accessing the peripheral applications. If new signals were not discovered, step 603 is revisited, immediately or after a predetermined time period. If new signals were discovered, the central application proceeds to step 607. At step 607, the central application collates the signals based on predetermined rules and metrics. Collating the signals may include ranking the signals and storing them in memory. Step 609 queries whether a trigger occurred. If not, the central application keeps revisiting step 609, either substantially continuously, or at predetermined intervals. If a trigger did occur, the central application proceeds to step 611 and displays the collated signals on a display. Step 611, displaying the collated signals, may include an audio or tactile component.

Step 613 queries whether an action was performed in response to a displayed signal. If not, step 603 is revisited, immediately or after a predetermined time period. If an action was performed, the central application proceeds to step 615. Step 615 conveys the action to the appropriate peripheral application. Subsequently, step 603 is revisited, immediately or after a predetermined time period.

Figure 7:
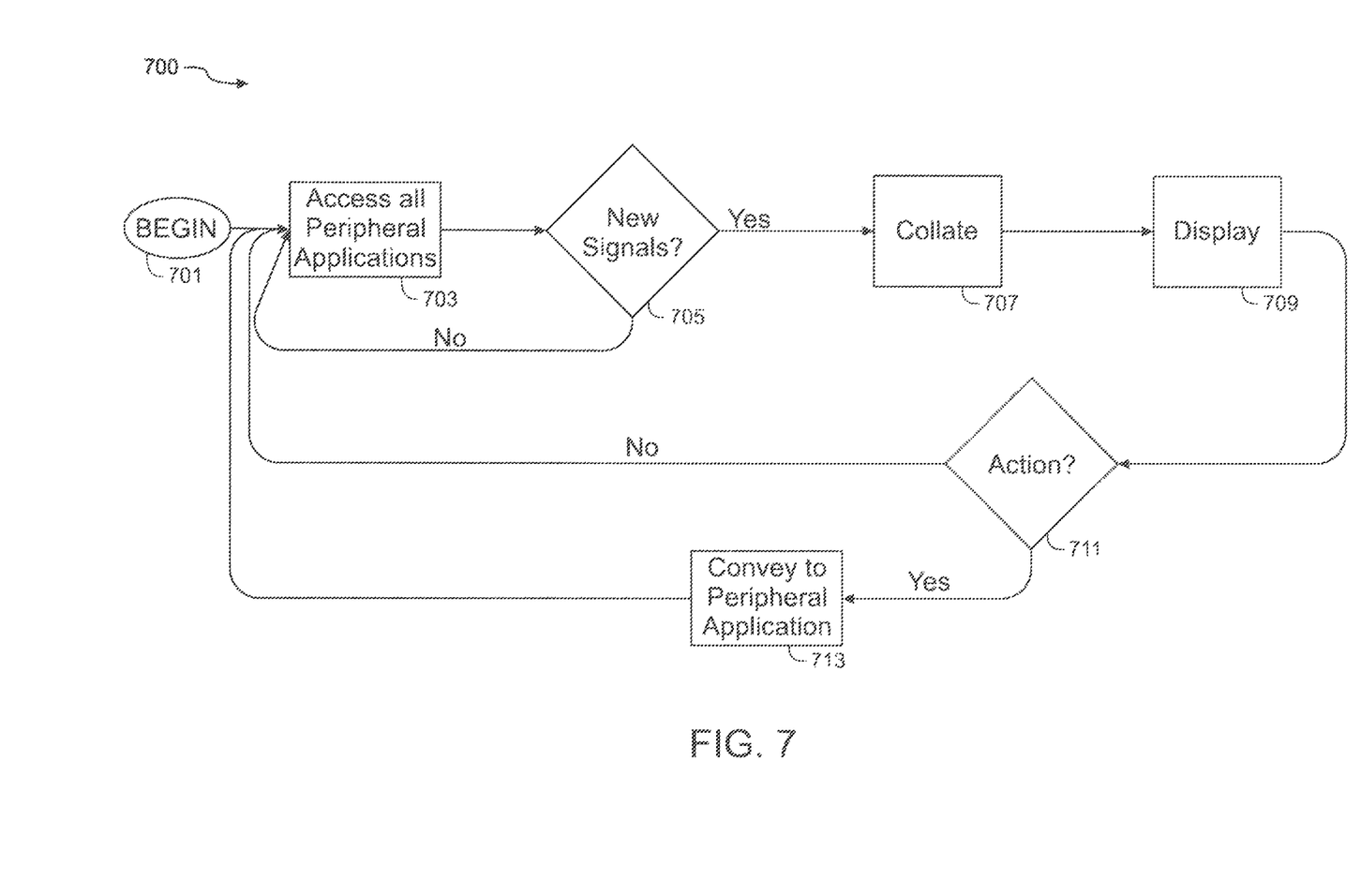
FIG. 7 shows another illustrative flowchart in accordance with principles of the disclosure.

FIG. 7 shows illustrative flowchart 700 in accordance with principles of the disclosure. The flowchart begins at step 701. At step 703, a central application on a computer system accesses a set of peripheral applications. The set may be a predetermined set. The set may be a complete set of all peripheral application associated with the computer system. The set may be manually established and/or modified. Establishing the set may include identifying which peripheral applications to include in the set. The set may include software programs, software applications (apps), websites, applications based in hardware, software, firmware, cloud, or network, or any other suitable signal-generating application.

Step 705 asks whether any new signals were discovered when accessing the peripheral applications. If no new signals were discovered, step 703 is revisited, immediately or after a predetermined time period. If new signals were discovered, the central application proceeds to step 707. At step 707, the central application collates the signals based on predetermined rules and metrics. Collating the signals may include ranking the signals and storing them in memory. The central application proceeds to step 709 and displays the collated signals on a display. The central application may substantially continuously display collated signals on a portion of the display.

Step 711 queries whether an action was performed in response to a displayed signal. If not, step 703 is revisited, immediately or after a predetermined time period. If an action was performed, the central application proceeds to step 713. Step 713 conveys the action to the appropriate peripheral application. Subsequently, step 703 is revisited, immediately or after a predetermined time period.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for collating scattered signals in a computer system are provided. Persons skilled in the art will appreciate that the present invention can be practiced by other than the described embodiments, which are presented for purposes of illustration rather than of limitation, and that the present invention is limited only by the claims that follow.

What is claimed is:

1. A central application for collating scattered signals in a computer system, the central application comprising computer-executable code stored in a non-transitory memory of the computer system, wherein the central application, when run on a processor of the computer system, is configured to:
    access one or more of the scattered signals, each of the scattered signals generated by one of a plurality of peripheral applications associated with the computer system;
    collate the accessed scattered signals based at least in part on a set of predetermined rules to create a set of collated signals;
    store the set of collated signals in the memory;
    in response to a predetermined trigger, present the set of collated signals on a display of the computer system based at least in part on the set of predetermined rules;
    when presented on the display, configure said set of collated signals to be actionable in the central application via an input/output component of the computer system;
    communicate with one or more of the peripheral applications via one or more secure, bidirectional, channels, each secure, bidirectional, channel enabling communication between the central application and one of the peripheral applications; and
    transmit, over one of the secure, bidirectional, channels, an action performed in the central application in response to one of the collated signals, said transmitted action being to one of the peripheral applications, said one of the peripheral applications that generated said one of the collated signals;
    wherein:
        each of the secure, bidirectional, channels provides the central application with the ability to transmit actions to a peripheral application that is access-restricted; and
        the central application is further configured to simultaneously support a first peripheral application that is a messaging application and a second peripheral application that is a banking application, and when one of the collated signals is a payment due alert from the banking application, the central application is configured to authorize a payment from a bank account.

2. The central application of claim 1, further configured to communicate, via a privileged channel, with at least one peripheral application, said at least one peripheral application being access-restricted, said communication for the accessing of signals, and said privileged channel that provides the central application with the ability to pull signals that are generated by, and stored in, the at least one peripheral application.

3. The central application of claim 1, wherein the accessing of scattered signals includes receiving the scattered signals at the central application.

4. The central application of claim 1, wherein the predetermined trigger is substantially continuous.

5. The central application of claim 1, wherein the predetermined trigger is:
    periodic, based on a preset period of time elapsed between triggers;
    based on a preset time; and/or
    based on a preset event.

6. The central application of claim 1, wherein the presenting the set of collated signals on a display of the computer system based at least in part on the set of predetermined rules includes presenting the collated signals on the display from top to bottom ranked in order of decreasing urgency, the urgency of each signal being based at least in part on a time allotted to perform an action in response to the signal.

7. The central application of claim 1, wherein the presenting the set of collated signals on a display of the computer system based at least in part on the set of predetermined rules includes presenting the signals in order of decreasing relevancy to the computer system.

8. The central application of claim 7, wherein the relevancy is determined at least in part based on historical data, said historical data including actions performed on the computer system.

9. The central application of claim 7, wherein the relevancy is determined at least in part using artificial intelligence and/or machine learning technology.

10. A central application for collating scattered signals in a computer system, the central application comprising computer-executable code stored in a non-transitory memory of the computer system, wherein the central application, when run on a processor of the computer system, is configured to:
    access one or more scattered signals, said scattered signals being generated by at least one of a plurality of peripheral applications of the computer system;
    collate the scattered signals based at least in part on a set of predetermined rules;
    store the collated signals in the memory; and
    in response to a predetermined trigger, present the collated signals on a display of the computer system based at least in part on the set of predetermined rules, wherein the presenting includes presenting the signals in order of decreasing relevancy to the computer system, and said relevancy is determined at least in part based on historical data, said historical data including actions performed on the computer system, and said relevancy comprises a time-based metric, wherein the relevancy of a signal is at least in part a function of a current time of the presenting relative to a time of the actions of the historical data.

11. The central application of claim 10, wherein the collated signals are actionable in the central application, and an action performed in the central application in response to one of the collated signals is disseminated over a secure channel to a peripheral application from which the collated signal was accessed, said conveying being configured to bypass a password protection of the peripheral application.

12. The central application of claim 10, wherein the accessing one or more signals includes pulling a signal that is generated by, and stored in, one of the plurality of peripheral applications, said accessing being configured to bypass a password protection of said one of the plurality of peripheral applications.

\* \* \* \* \*